(12) United States Patent
Jones et al.

(10) Patent No.: US 10,245,966 B2
(45) Date of Patent: Apr. 2, 2019

(54) VEHICLE ARCHITECTURES, DEVICES AND CONTROL ALGORITHMS FOR MANAGING WIRELESS VEHICLE CHARGING

(71) Applicant: GM GLOBAL TECHNOLOGY OPERATIONS LLC, Detroit, MI (US)

(72) Inventors: Brandon R. Jones, White Lake, MI (US); Ryan M. Ashby, Novi, MI (US); Andrew J. Namou, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 15/484,543

(22) Filed: Apr. 11, 2017

(65) Prior Publication Data
US 2018/0290551 A1  Oct. 11, 2018

(51) Int. Cl.
| | |
|---|---|
| *B60L 11/00* | (2006.01) |
| *G05D 1/00* | (2006.01) |
| *H02J 7/00* | (2006.01) |
| *H02J 50/60* | (2016.01) |
| *B60L 11/18* | (2006.01) |
| *B60Q 1/46* | (2006.01) |
| *B60Q 5/00* | (2006.01) |
| *G05D 1/02* | (2006.01) |
| *H02J 7/02* | (2016.01) |

(52) U.S. Cl.
CPC ......... *B60L 11/1833* (2013.01); *B60L 11/182* (2013.01); *B60L 11/1829* (2013.01); *B60Q 1/46* (2013.01); *B60Q 5/005* (2013.01); *G05D 1/0088* (2013.01); *G05D 1/0214* (2013.01); *H02J 7/025* (2013.01); *H02J 50/60* (2016.02); *B60L 2260/42* (2013.01); *B60L 2270/00* (2013.01)

(58) Field of Classification Search
CPC .... B60L 11/00; B60L 11/182; B60L 11/1829; H02J 50/60; H02J 7/00; H02J 7/025; B60Q 1/00; B60Q 1/46; B60Q 5/00; B60Q 5/005; G05D 1/00; G05D 1/0088; G05D 1/0214
See application file for complete search history.

(56) References Cited

U.S. PATENT DOCUMENTS

| | | | | |
|---|---|---|---|---|
| 9,533,589 B2 * | 1/2017 | Garcia Briz | ........ | B60L 11/1829 |
| 9,680,313 B2 * | 6/2017 | Grilli | ................. | G06Q 30/0267 |

(Continued)

*Primary Examiner* — Yonel Beaulieu
(74) *Attorney, Agent, or Firm* — Quinn IP Law

(57) ABSTRACT

Disclosed are control algorithms and system architectures for managing wireless vehicle charging, including vehicles with rechargeable battery packs, wireless charging capabilities, and control logic for governing such charging. A method is disclosed for managing charging of an electrical storage unit of a motor vehicle at a wireless vehicle charging station. The method includes: receiving a sensor signal indicating detection of an obstruction within a predetermined proximity of the vehicle charging station; determining whether the detected obstruction is living or lifeless; initiating, via a vehicle controller responsive to the detected obstruction being a living object, a first remedial action strategy that commands the vehicle to generate a visual or audible cue to drive away the living object; and, initiating, via the vehicle controller responsive to the detected obstruction being a lifeless object, a second remedial action strategy that commands the motor vehicle to move and thereby avoid contact with the object.

20 Claims, 2 Drawing Sheets

(56) References Cited

U.S. PATENT DOCUMENTS

| | | |
|---|---|---|
| 9,698,632 B2 * | 7/2017 | Davison ................ H02J 7/0044 |
| 9,908,506 B2 * | 3/2018 | Taylor ...................... H02J 7/00 |
| 10,018,744 B2 * | 7/2018 | Roy ........................ H02J 17/00 |
| 2008/0265835 A1 | 10/2008 | Reed et al. |
| 2010/0198754 A1 | 8/2010 | Jones et al. |
| 2012/0181953 A1 | 7/2012 | Hsu et al. |
| 2013/0027048 A1 | 1/2013 | Schwarz et al. |
| 2013/0038279 A1 | 2/2013 | Seyerle et al. |
| 2014/0197776 A1 | 7/2014 | Schlaupitz et al. |
| 2016/0052450 A1 | 2/2016 | Chan et al. |
| 2016/0087687 A1 * | 3/2016 | Kesler .................. H04B 5/0037 307/104 |
| 2016/0285296 A1 | 9/2016 | Namou et al. |
| 2018/0189683 A1 * | 7/2018 | Newman ................ G06Q 10/02 |

* cited by examiner

VEHICLE ARCHITECTURES, DEVICES AND CONTROL ALGORITHMS FOR MANAGING WIRELESS VEHICLE CHARGING

TECHNICAL FIELD

The present disclosure relates generally to electrical charging systems for recharging motor vehicles. More specifically, aspects of this disclosure relate to electric-drive vehicles with a rechargeable battery pack and wireless charging capabilities.

BACKGROUND

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., differential, axle, and road wheels) through a multi-speed power transmission. Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full-electric vehicles, on the other hand, utilize alternative power sources, such as an electric motor-generator, to propel the vehicle and minimize or eliminate reliance on an engine for power.

Hybrid vehicles utilize various traction power sources, such as an ICE assembly operating in conjunction with a battery powered or fuel-cell powered electric motor, to propel the vehicle. A hybrid electric vehicle (HEV), for example, stores both electrical energy and chemical energy, and converts the same into mechanical power to propel the vehicle and power the vehicle's assorted systems. The HEV is generally equipped with one or more electric machines (E-machine), such as electric motor/generators, that operate individually or in concert with an internal combustion engine to propel the vehicle. Some HEV powertrains utilize a fuel cell stack to supply electric power for the electric traction motors. Since hybrid vehicles are designed to derive their power from sources other than the engine, engines in HEVs may be turned off, in whole or in part, while the vehicle is propelled by the alternative power source(s).

A full electric vehicle (FEV)—colloquially known as "all-electric" vehicles—is an alternative type of electric-drive vehicle configuration that altogether eliminates the internal combustion engine and attendant peripheral components from the powertrain system, relying solely on electric tractive motors for vehicle propulsion. Battery electric vehicles (BEV), for example, utilize energy stored within a rechargeable, onboard battery pack, rather than a fuel tank, fuel cell, or fly-wheel, to power these electric motors. The electric vehicle employs an electrical power distribution system for transmitting electrical energy back-and-forth between the onboard battery pack and one or more electric motors via a motor controller. Plug-in electric vehicle (PEV) variations allow the battery pack to be recharged from an external source of electricity, such as a public power grid via a residential or commercial vehicle charging station As electric vehicles become more popular and more prevalent, infrastructure is being developed and deployed to make day-to-day use of such vehicles feasible and convenient. Electric vehicle supply equipment (EVSE) comes in many forms, including residential electric vehicle charging stations (EVCS) owned and operated by a vehicle owner (e.g., installed in the owner's garage), publicly accessible EVCS deployed by public utilities or private retailers (e.g., at gas stations or public charging stations), and more sophisticated high-voltage, high-current charging stations used by automobile dealers and service stations. Plug-in electric vehicles originally equipped with an onboard traction battery pack, for example, can be charged by physically connecting a charging cable of the EVCS to a complementary charging port of the vehicle. Wireless electrical charging systems have also been developed for charging and recharging electric-drive vehicles without the need for charging cables and cable ports. Many such wireless charging systems utilize electromagnetic field (EMF) induction techniques to establish an electromagnetic coupling between a charging pad or platform external to the vehicle and a compatible receiver component onboard the vehicle. This receiver component is electrically connected to the rechargeable battery pack to transmit thereto current induced by the external charging pad/platform.

SUMMARY

Disclosed herein are vehicle control algorithms and system architectures for managing wireless vehicle charging, methods for implementing such algorithms and methods for operating such architectures, and electric vehicles with onboard rechargeable battery packs, wireless charging capabilities, and control logic for governing such charging in the presence of unexpected obstructions. By way of example, and not limitation, there is presented an Electric Vehicle Communications Controller (EVCC) programmed with remedial action strategies for vehicles equipped with a wireless inductive charging system. When a vehicle is actively charging with Wireless Electric Vehicle Supply Equipment (WEVSE), the vehicle's wireless system monitors for wireless power quality issues, such as misalignment, intrusion of living and non-living objects (also referred to herein as "obstructions"), and faulty grid power. Verification may be performed continuously prior to, during, and/or immediately after active charging, as well as upon re-initialization during a delayed charge as circumstances may have changed. In the event that conditions have changed, the EVCC may responsively remedy any detected moving object or stationary obstruction via visual and/or audible cues. If the EV has autonomous capabilities, a remedial action strategy of repositioning or relocating the vehicle can be invoked. If applicable, a driver or occupant can be notified and, optionally, presented with options to complete charging event, deviate and proceed with charging, terminate charging, modify remedial actions, etc.

Responsive to detection of a living obstruction, the EVCC may invoke an audible prompt from one or more vehicle components that create noise in an attempt to drive away the obstruction. This can be a single source or a combination sources, including any of the following examples: engage Pedestrian Friendly Alert Function (PFAF); sound car horn; employ vehicle telematics or stereo component; start or rev engine; engage fans and pumps (e.g., HVAC, battery coolant, power electronic coolant loop, etc.). Responsive to detection of a non-living foreign obstruction, the EVCC may invoke a visual cue of flashing headlamps and accessory lights. Responsive to continued detection of a living or non-living obstruction, where the vehicle was unable to remedy the situation after a first attempt, the vehicle may invoke a retry strategy. Optionally, the EVCC may prompt the driver or an occupant, e.g., via a remote application, mobile device push notification, etc., for approval of remedial action, retry strategy, and the input of new charge preferences. If the vehicle has autonomous capabilities, detection of a living obstruction may elicit a remedial action strategy to reposition or otherwise move the vehicle to avoid contacting or scare off the living object. For fully and partially autonomous vehicles, detection of a foreign object may elicit a remedial action strategy that polls the area charging infrastructure, and automatically relocates the vehicle to another available charge station.

Attendant benefits for at least some of the disclosed concepts include enabling automated and operator-initiated vehicle responses for remediating the undesirable intrusion of non-living and living foreign obstructions at any point during the wireless vehicle charging process. Disclosed systems, methods and devices allow the vehicle to automatically perform remedial actions to resolve obstruction issue(s), e.g., when a driver or passenger is not present or not responsive. Other attendant benefits may include allowing a driver or passenger to proactively address or otherwise resolve charging interoperability issues. Disclosed concepts enable wireless vehicle charging for fully autonomous electric vehicles when a living or non-living obstruction is present.

Aspects of the present disclosure are directed to control logic and computer-executable algorithms for remediating the intrusion of foreign obstructions—living or non-living—during wireless charging of motor vehicles. Disclosed, for example, is a method for managing charging of an electrical storage unit, such as a rechargeable traction battery pack, of a motor vehicle at a wireless vehicle charging station. This method includes, in any order and in any combination with any of the disclosed features and options: receiving, via a vehicle controller from a sensor, a signal indicative of detection of an obstruction within a predetermined proximity of the wireless vehicle charging station; determining, via the vehicle controller, whether the detected obstruction is a living object (e.g., a wild animal) or a lifeless object (e.g., another vehicle); initiating, via the vehicle controller responsive to a determination that the detected obstruction is a living object, a first remedial action strategy including commanding the motor vehicle to generate a visual or audible cue to drive away the living object; and initiating, via the vehicle controller responsive to a determination that the detected obstruction is a lifeless object, a second remedial action strategy including commanding the motor vehicle to reposition and thereby avoid contact with the object.

Other aspects of the present disclosure are directed to motor vehicles equipped with one or more rechargeable battery packs, wireless charging capabilities, such as an in-vehicle inductive charging system, and control logic for governing such wireless recharging. A "motor vehicle," as used herein, may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. In an example, an electric-drive motor vehicle is presented that includes a vehicle body, a traction battery back mounted to the vehicle body, and a wireless charging receiver component electrically coupled to the traction battery back and configured to operably couple with a charging pad or platform of a wireless vehicle charging station.

The motor vehicle also includes a vehicle controller that is attached to the vehicle body and communicatively coupled to one or more resident/remote sensing devices. This vehicle controller is programmed to receive a sensor signal indicative of an obstruction detected within a predetermined proximity of the wireless vehicle charging station, and determine whether the detected obstruction is a living or non-living object. Responsive to determining that the detected obstruction is a living object, the controller initiates a first remedial action strategy that commands the motor vehicle to generate a visual or audible cue to drive away the living object. However, if it is determined that the detected obstruction is a lifeless object, the controller initiates a second remedial action strategy that commands the vehicle to reposition and thereby avoid contact with the lifeless object.

Additional aspects of the present disclosure are directed to non-transitory, computer readable media storing instructions for execution by at least one of one or more processors of at least one of one or more in-vehicle electronic control units. These instructions, when executed, cause the ECU(s) to perform various steps, including: receiving, from a sensor, a signal indicative of detection of an obstruction within a predetermined proximity of the wireless vehicle charging station; determining whether the detected obstruction is a living object or a lifeless object; initiating, responsive to a determination that the detected obstruction is a living object, a first remedial action strategy including commanding the motor vehicle to generate a visual or audible cue configured to drive away the living object; and initiating, responsive to a determination that the detected obstruction is a lifeless object, a second remedial action strategy including commanding the motor vehicle to reposition such that the motor vehicle avoids contact with the lifeless object.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
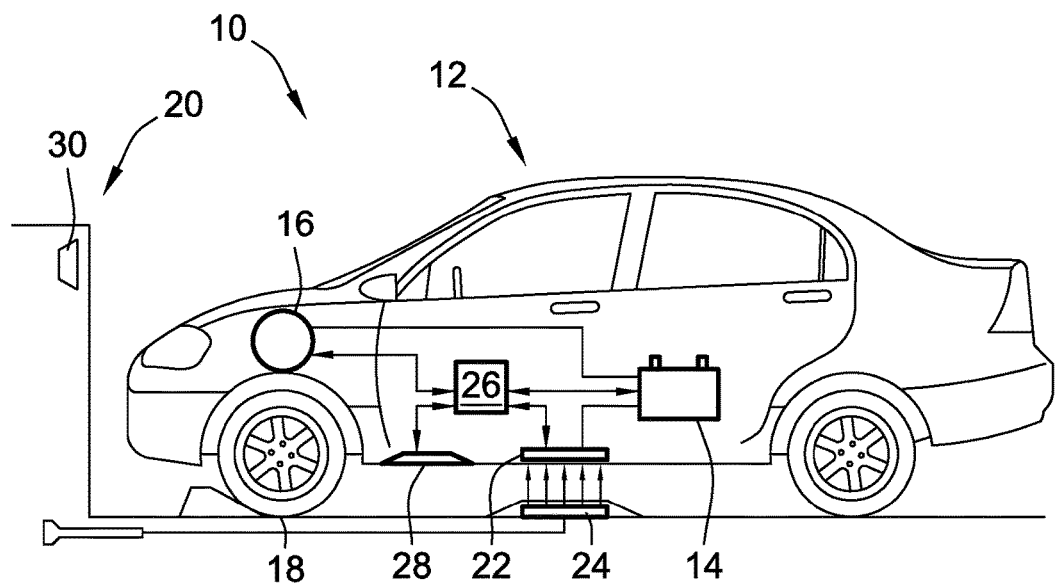
FIG. 1 is a schematic side-view illustration of a representative motor vehicle operably coupled to a representative wireless vehicle charging station in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Aspects of the present disclosure are directed to an Electric Vehicle Communications Controller (EVCC) programmed to execute remedial action strategies for vehicles equipped with an onboard wireless (inductive) charging system. When a vehicle is actively charging with a Wireless Electric Vehicle Supply Equipment (WEVSE), the wireless system monitors (continuously, sporadically, systematically, on-demand, etc.) for wireless power quality issues, such as alignment/misalignment, foreign object (living and non-living) intrusion, faulty grid power, etc. In some instances, this verification may need to be performed continuously during active charging as well as upon re-initialization of a delayed charge as circumstances may have changed. In the event that conditions have been compromised, the EVCC will attempt remedy any detected living obstruction (e.g., a stray or wild animal, distracted pedestrian, other driver, etc.) via automated visual and/or audible cues designed to induce the obstruction to move. If the vehicle has autonomous capabilities, a remedial action strategy may include repositioning and/or relocating the vehicle to avoid inadvertent contact with either a living or a non-living foreign object. Optional features include outputting a notification to a driver or occupant with notice of the obstruction and options, e.g., to proceed with recommended/default remedial action(s), set one or more system parameters, deviate and proceed, delay charging event, or terminate the charging event.

On detection of intrusion of a living object, the EVCC may execute a method to deter, and then commence charging once the living object is no longer sensed. As an example, the EVCC may automatically respond to the intrusion of a living object by invoking an audible and/or visual prompt from originally equipped vehicle components that create light and sound. This can be a single source or a combination of sources, such as: sound a Pedestrian Friendly Alert Function (PFAF) horn; output cue from a radio/stereo component; start or rev the engine or motor; start or rev in-vehicle fans and/or pumps, flash front or rear lamps, etc. Responsive to continued detection of a living or non-living foreign object that the EVCC was unable to remedy with a preliminary mitigating action, the EVCC can invoke a retry strategy with remedial actions. The amount of times a retry strategy can be implemented may be restricted by a system default threshold or by a user-set parameter. If desired, the EVCC will prompt the customer, e.g., via an in-vehicle telematics unit, an electronic communication, or a mobile device notification, for approval of any proposed remedial action, retry strategy, etc., and will input new charge preferences. Disclosed features help to mitigate issues related to unwanted object intrusion prior to, during and after wireless charging events. Other attendant benefits may include ensuring maximum wireless power transfer for attended and unattended vehicles.

Referring now to the drawings, wherein like reference numbers refer to like features throughout the several views, there is shown in FIG. 1 a schematic illustration of a representative automobile, which is designated generally at 10 and portrayed herein for purposes of discussion as a four-door, electric-drive (full or hybrid) vehicle. Packaged within a vehicle body 12 of the automobile 10, e.g., within a passenger compartment, a trunk compartment, or a dedicated battery compartment, is a traction battery pack 14 that is electrically coupled to and powers one or more electric motor-generators 16 that operate to turn wheels 18 and thereby propel the vehicle 10. The illustrated automobile 10—also referred to herein as "motor vehicle" or "vehicle" for short—is merely an exemplary application with which many aspects and features of this disclosure may be practiced. In the same vein, implementation of the present concepts via the specific electric vehicle supply equipment (EVSE) architecture illustrated in FIG. 1 should also be appreciated as an exemplary application of the concepts and features disclosed herein. As such, it will be understood that aspects and features of this disclosure may be applied to other types of EVSE, and implemented for any logically relevant type of motor vehicle. Moreover, only select components of the vehicle 10 have been shown and will be described in additional detail herein. Nevertheless, the motor vehicles and EVSE architectures discussed herein can include numerous additional and alternative features, and other well-known peripheral components, for example, for carrying out the various methods and functions of this disclosure. Lastly, the drawings presented herein are not necessarily to scale and are provided purely for instructional purposes. Thus, the specific and relative dimensions shown in the drawings are not to be construed as limiting.

FIG. 1 is a simplified illustration of the electric drive vehicle 10 docked at and operably coupled to a wireless charging station 20 for recharging an onboard rechargeable energy source, such as a high-voltage direct current (DC) traction battery pack 14 with an array of lead-acid, lithium-ion, or other applicable type of rechargeable electric vehicle batteries (EVB). To provide this operable coupling, the vehicle 10 may include an inductive charging component 22, e.g., with an integrated induction coil, that is onboard the vehicle 10. This inductive charging component 22 is compatible with a wireless charging pad or platform 24, e.g., with an EMF coil, of the wireless charging station 20. In the illustrated example, the wireless charging pad/platform 24 is located on the ground or floor of the wireless charging station 20, and is positioned in accordance with a "target location" that serves as a desired parking location, e.g., for purposes of efficient and effective wireless charging of the vehicle 10. In particular, FIG. 1 depicts the vehicle 10 parked in a location that helps to ensure the inductive charging component 22 is substantially or completely aligned in both lateral and longitudinal dimensions with the wireless charging pad 24. Put another way, the vehicle 10 in FIG. 1 is considered to be in proper fore-aft alignment and in proper starboard-port alignment with a designated target location.

The wireless charging station 20 may employ any heretofore and hereinafter developed type of wireless charging technology, including inductive charging, radio charging, and resonance charging, as some non-limiting examples. In accordance with electromagnetic induction charging technology, the representative wireless charging pad 24 of FIG. 1 can be activated with electric current to generate an alternating electromagnetic field proximate the inductive charging component 22. The generated magnetic field, in turn, induces an electric current in the inductive charging component 22 of the vehicle 10. This induced current is used to charge the traction battery pack 14 or other energy source (e.g., standard 12V lead-acid starting, lighting, and ignition (SLI) battery) of the electric drive vehicle 10. As mentioned previously, the optimal wireless charging performance may be obtained when the inductive charging component 22 is properly aligned with the wireless charging pad 24.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented herein by electronic control unit (ECU) 26, that regulates the operation of onboard vehicle components. Contactors controlled by the ECU 26, for example, may isolate the traction battery pack 14 from other components when opened, and connect the traction battery pack 14 to other components when closed. The ECU 26 is also communicatively connected to the electric motor-generator(s) 16 to control, for example, bi-directional transfer of energy between the traction battery pack 14 and motor-generator(s) 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the wireless charging station 20 to the battery pack 14 to help ensure proper voltage and current levels. The ECU 26 may also interface with the charging station 20, for example, to coordinate the delivery of power to the vehicle 10.

As part of the wireless charging process, the electric drive vehicle 10 monitors wireless power quality and related issues that may affect charging. According to the illustrated example, the vehicle ECU 26 of FIG. 1 communicates with and receives sensor signals from a monitoring system, which may comprise one or more onboard "resident" sensing devices 28 of the vehicle 10 and/or one or more off-board "remote" sensing devices 30 of the wireless charging station 20. In practice, this monitoring system may include a single sensor, or it may include a distributed sensor architecture with an assortment of sensors packaged at similar or alternative locations to that shown in the drawings. These sensing devices are operable, independently or through cooperative operation, to detect the intrusion of living and non-living foreign objects (also referred to herein as "obstructions"), among other things. By way of non-limiting example, the resident sensor 28 many take on many different forms, including an infrared sensor (e.g., a DC 5V 0-2 meter adjustable infrared beam proximity sensor), and the remote sensor 30 many take on many different forms, including an ultrasonic sensor (e.g., SU, UK and TU series round-body reflective ultrasonic proximity sensors). There are numerous other types of sensing devices that can also be used, including, for example, thermal sensing devices, such as passive thermal infrared sensors, optical sensing devices, such as light- and laser-based sensors, acoustic sensing devices, such as surface acoustic wave (SAW) and ultrasonic sensors, capacitive sensing devices, such as capacitive-based proximity sensors, etc.

Figure 2:
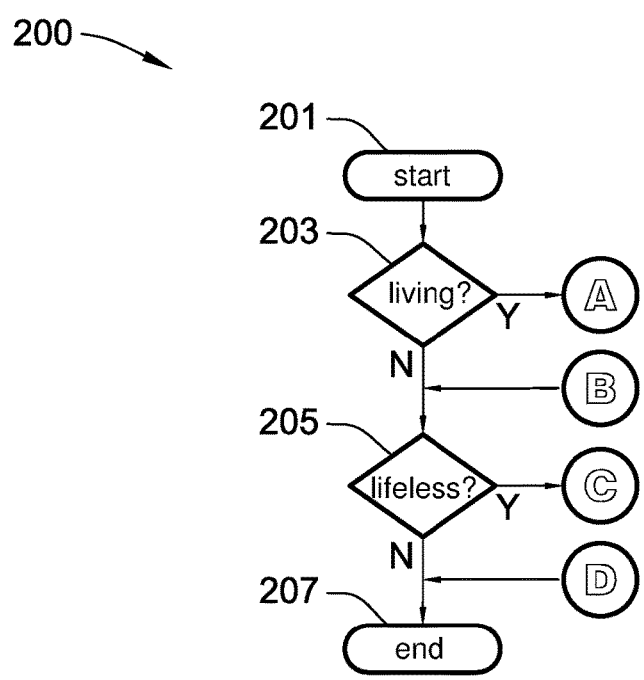
FIG. 2 is a flowchart for an object intrusion protocol for wireless electric vehicle charging that may correspond to instructions executed by onboard control-logic circuitry, programmable electronic control unit, or other computer-based device of a motor vehicle in accord with aspects of the disclosed concepts.
Figure 3:
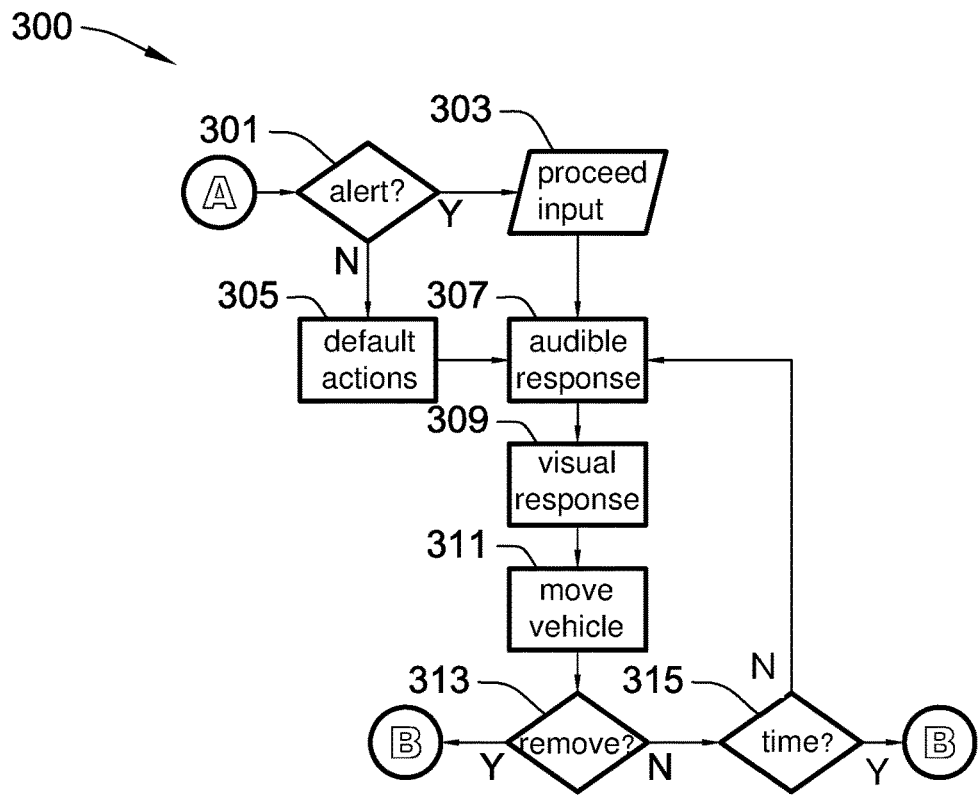
FIG. 3 is a flowchart for a living foreign obstruction remediation protocol that may correspond to instructions executed by onboard control-logic circuitry, programmable electronic control unit, or other computer-based device of a motor vehicle in accord with aspects of the disclosed concepts.
Figure 4:
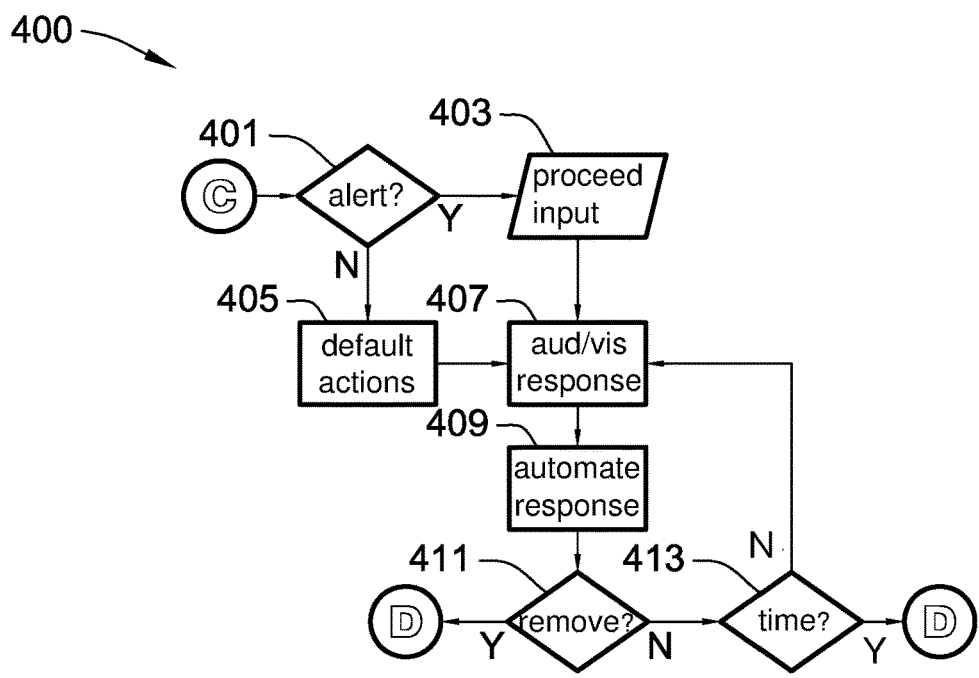
FIG. 4 is a flowchart for a non-living foreign obstruction remediation protocol that may correspond to instructions executed by onboard control-logic circuitry, programmable electronic control unit, or other computer-based device of a motor vehicle in accord with aspects of the disclosed concepts.

FIG. 2 illustrates a series of representative operations for executing an object intrusion protocol for wireless electric vehicle charging. In this regard, FIG. 3 illustrates a series of representative operations for executing a living foreign obstruction remediation protocol for wireless electric vehicle charging. Conversely, FIG. 4 illustrates a series of representative operations for executing a non-living foreign obstruction remediation protocol for wireless electric vehicle charging. Some or all of the operations portrayed in FIGS. 2-4 and described herein can be representative of algorithms or methods 200, 300 and 400, respectively, that correspond to processor-executable instructions that can be stored, for example, in main or auxiliary or remote memory, and executed, for example, by an ECU, a CPU, a dedicated IC device, an on-board or remote control logic circuit, or a network of devices, to perform any or all of the above and/or below described functions associated with the disclosed concepts.

Turning first to FIG. 2, the object intrusion protocol 200 starts at block 201 with receiving a wireless quality alert, which may originate with either sensor 28, 30 generating a "proximity intrusion" signal responsive to an unexpected foreign obstruction being detected within a predetermined proximity (e.g., within a 10-15 meter diameter perimeter) of the wireless vehicle charging station 20. Prior to, contemporaneous with, or after receiving the foregoing proximity intrusion sensor signal from one or both sensors, the vehicle ECU 26 may communicate with the wireless vehicle charging station 20 to initiate pre-charging procedures, e.g., confirming the charging station is available and operating properly, receiving instructions for properly docking the vehicle, confirming proper alignment and compatibility between the inductive charging component 22 and wireless charging pad 24, etc. Once pre-charging procedures have been complete and the vehicle 10 is operably mated with the charging station 20, the ECU 26 will receive a signal, e.g., from the wireless charging station 20 or the onboard charging component 22, indicating that charging of the traction battery pack 14 has commenced. For at least some preferred embodiments, vehicle ECU 26 will continuously track wireless charging quality, including monitoring the proximity of the wireless vehicle charging station 20 for intrusion of an obstruction, during wireless charging of the battery pack 14. Optionally, if the vehicle controller 26 receives a sensor signal indicating intrusion of a foreign obstruction during a charging event, charging of the electrical storage unit 14 may be terminated or temporarily paused while the system attempts to remedy the situation.

At decision block 203, the vehicle ECU 26 determines if the detected obstruction is a living object, such as a stray pet, squirrel, wandering pedestrian, bird, another driver or any other living entity that may interfere with a wireless charging event. This may be accomplished by any known means, including using laser trip wires, infrared sensing devices capable of detecting body heat, pressure-sensitive pads, thermal sensors, etc. If the method 200 determines that the obstruction is a living object (Block 203=Y), the method 200 continues to the living foreign obstruction remediation protocol 300 of FIG. 3, as indicated with the circled "A" in FIGS. 2 and 3. Conversely, if it is determined that the detected obstruction is not living (Block 203=N), the method 200 continues to decision block 205 where the vehicle ECU 26 determines if the detected obstruction is a non-living or "lifeless" object, such as another automobile, a parked bicycle or motorcycle, tree branch, garbage can, debris, or other inanimate object. This determination may be accomplished with any of the known sensing means disclosed herein. If the method 200 determines that the obstruction is a non-living object (Block 205=Y), the method 200 continues to the non-living foreign obstruction remediation protocol 400 of FIG. 4, as indicated with the circled "C" in FIG. 2. Conversely, if it is determined that the detected obstruction is not a non-living object or, what's more likely, that the foreign object is no longer an obstruction (Block 205=N), the object intrusion protocol 200 concludes at block 207.

When it is determined that a detected obstruction is a living object, the living foreign obstruction remediation protocol 300 illustrated in FIG. 3 is initiated via the vehicle ECU 26. This protocol 300, or select portions thereof, may be considered an automated "first remedial action strategy" designed to ameliorate the undesirable intrusion of foreign objects that may impede or otherwise affect wireless charging. At decision block 301, the foreign obstruction remediation protocol 300 may optionally decide whether or not to alert a customer (e.g., a driver or occupant or attendant) via electronic transmission notifying of the detected intrusion of the living object. This transmission may include a user prompt with an indication of the presence, type, size, etc., of the detected obstruction, and a request for a user input to approve the initiation of the first remedial action strategy. At block 303, the ECU 26 receives, e.g., from a touchscreen video display of an in-vehicle telematics center console unit or a handheld cellular-enabled smartphone, a user input to proceed with current or default settings, one or more user-desired parameters that modify one or more parts of the first remedial action strategy, or a user input overriding or otherwise disengaging the protocol 300. If a customer notification is not sent (i.e., decision block 301 is omitted or disengaged) or a user response is not received (Block 301=N), the method 300 proceeds to block 305 and default remedial action settings are implemented.

Living foreign obstruction remediation protocol 300 of FIG. 3 continues to blocks 307-311 to generate an automated vehicle response to the detected obstruction in an attempt to remove or circumvent the living object. This automated response may include, as some non-limiting examples, commanding the motor vehicle to generate a visual cue and/or an audible cue that is/are designed to drive away the living object. Another optional or alternative automated response may include resituating or otherwise moving the vehicle to avoid vehicle interaction with the living obstruction. As one example, the motor vehicle 10 includes numerous sound-generating components, such as horns, fans, pumps, speaker components, telematics and/or infotainment components, motor, engine, etc. In this instance, the first remedial action strategy includes, at block 307, determining an audible response, if any, and commanding one or more of these sound-generating components to output an audible cue designed to drive away the living object. In the same vein, the motor vehicle 10 includes various light-generating components that provide interior and exterior illumination for the vehicle operator, such as headlight and taillight assemblies, daylight running lamps (DRL), center high-mounted safety lamps (CHMSL), etc. The method 300 continues to block 309 to determine a visual response, if any, and commanding one or more light-generating components to output a visual cue designed to drive away the living object.

An intended application of at least some of the disclosed features and concepts may include motor vehicles that have autonomous driving capabilities. As user herein, a motor vehicle with "autonomous driving capabilities"—also known as "autonomous vehicles" or "self-driving vehicles"—includes Society of Automotive Engineer (SAE) classified Level 2 "Partial Automation" vehicles (automated vehicle control of steering, acceleration and deceleration with driver physically disengaged from steering wheel and pedals), SAE classified Level 5 "Full Automation" vehicles (full-time performance by automated driving system of all aspects of dynamic driving under all roadway and environmental conditions), and any variation therebetween. If the vehicle 10 is equipped with autonomous driving capabilities, the living foreign obstruction remediation protocol 300 may include autonomously repositioning the motor vehicle to evade any detected living objects at block 311. The aforementioned repositioning may include rerouting the vehicle to a different charging station or rearranging the vehicle at the current charging station. Completing this particular operation may require the ECU 26 communicate with the wireless charging station 20 to ascertain the design of the charging station 20, the layout and traffic of the surrounding area, the availability/compatibility of neighboring charging stations, etc.

Upon completion of the remedial actions 307 and/or 309 and/or 311, protocol 300 may optionally initiate a "retry strategy" to assess whether or not the first remedial action strategy was successful in resolving the incursion of a living foreign object and, if not, whether or not to implement further procedures to address the presence of the living object. By way of example, and not limitation, protocol 300 may require the vehicle ECU 26 communicate with one or more of the sensors 28, 30 to determine, at decision block 313, if the obstruction has been removed (e.g., is no longer within the predetermined proximity of the wireless vehicle charging station 20). If it is determined that the obstruction is no longer present or the situation has otherwise been rectified (Block 313=Y), the method 300 continues back to protocol 200 of FIG. 2, as indicated with the circled "B" in FIGS. 2 and 3, and then protocol 300 terminates.

Responsive to a determination that the obstruction is still present or the situation has otherwise not been resolved (Block 313=N), protocol 300 moves to decision block 315 to determine whether or not to loop back to remedial actions 307, 309 and/or 311. This may require first determining, at block 315, if a predetermined time period has expired since the protocol 300 was first initiated (e.g., a timeout event has occurred) and/or if a maximum number of cycles (e.g., a default of three attempts) of the repeated loop illustrated in FIG. 3 has been completed. If the predetermined time period has expired or the maximum number of cycles has been completed (Block 315=Y), the retry strategy is terminated and the method 300 continues back to protocol 200 of FIG. 2, as indicated with the circled "B" in FIG. 3. However, if the determination at decision block 315 is negative (Block 315=N), protocol 300 will re-execute blocks 307-315 in a continuous loop until block 313 or block 315 results in a positive determination.

When it is determined that a detected obstruction is a non-living object, the non-living foreign obstruction remediation protocol 400 illustrated in FIG. 4 is initiated via the vehicle ECU 26. This protocol 400, or select portions thereof, may be considered an automated "second remedial action strategy" designed to ameliorate the undesirable intrusion of foreign objects that may impede or otherwise affect wireless charging. Similar to the living foreign obstruction remediation protocol 300 of FIG. 3, protocol 400 of FIG. 4 may begin at decision block 401 with determining whether or not to alert a user, e.g., via electronic transmission, of the detected intrusion of the non-living object. In this regard, protocol 400 of FIG. 4 may include any of the options and features discussed above with respect to the protocol 300 of FIG. 3, and vice versa, unless otherwise explicitly disclaimed. At block 403, the ECU 26 receives a user input to proceed with current or default settings, one or more user inputs with user-desired parameters that modify one or more portions of the second remedial action strategy, or a user input overriding or otherwise disengaging the protocol 400. If a customer notification is not sent (i.e., decision block 401 is omitted or disengaged) or a user response is not received (Block 401=N), the method 400 proceeds to block 405 and default remedial action settings are implemented.

With continuing reference to FIG. 4, non-living foreign obstruction remediation protocol 400 continues to blocks 407 and 409 to generate an automated vehicle response to the detected obstruction in an attempt to resolve the situation. This automated response may include, as some non-limiting examples, commanding the motor vehicle to generate a visual cue and/or an audible cue that is/are designed to drive away the living object. Another optional or alternative automated response may include resituating or otherwise moving the vehicle to avoid vehicle interaction with the living obstruction. As one example, the second remedial action strategy includes, at block 407, determining an audible and/or visual response, if any, and commanding one or more of the noise-generating and/or sound-generating components to output an audible cue designed to cause the non-living object to be moved. For instance, if the non-living object is an automobile that is obstructing the path of the vehicle 10, the audible/visible cue generated at block 407 may be designed to warn the automobile's operator/on-board controller to move the automobile. If the vehicle 10 is equipped with autonomous driving capabilities, the non-living foreign obstruction remediation protocol 400 may include autonomously repositioning, relocating, rerouting, etc., the motor vehicle to evade any detected obstruction at block 409.

Upon completion of the remedial actions 407 and/or 409, protocol 400 of FIG. 4 may optionally initiate a "retry strategy" to assess whether or not the second remedial action strategy was successful in resolving the incursion of a non-living foreign object and, if not, whether or not to implement further procedures to address the presence of the living object. By way of example, and not limitation, protocol 400 may require the vehicle ECU 26 communicate with one or more of the sensors 28, 30 to determine, at decision block 411, if the obstruction has been removed (e.g., is no longer within the predetermined proximity of the wireless vehicle charging station 20). If the obstruction is no longer present or the situation has been rectified (Block 411=Y), the method 400 continues back to protocol 200 of FIG. 2, as indicated with the circled "D" in FIGS. 2 and 4, and protocol 400 terminates. Responsive to the obstruction still being present or the situation not being resolved (Block 411=N), protocol 400 moves to decision block 413 to determine whether or not to loop back to remedial actions 407 and/or 409. At block 413, the ECU 26 may first determine if a timeout event has occurred or if a maximum number of cycles of the loop illustrated in FIG. 4 has been completed. If the timeout event has occurred or the maximum number of cycles has been completed (Block 413=Y), the retry strategy is terminated and the method 400 continues back to protocol 200 of FIG. 2. However, if the determination at decision block 413 is negative (Block 413=N), protocol 400 will re-execute blocks 407-413 in a continuous loop until block 411 or block 413 results in a positive determination.

Aspects of this disclosure may be implemented, in some embodiments, through a computer-executable program of instructions, such as program modules, generally referred to as software applications or application programs executed by an onboard vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for managing charging of an electrical storage unit of a motor vehicle at a wireless vehicle charging station, the method comprising:
   communicating, via a vehicle controller with the wireless vehicle charging station, to initiate charging of the electrical storage unit of the motor vehicle;
   monitoring a predetermined proximity of the wireless vehicle charging station for intrusion of an obstruction;
   receiving, via the vehicle controller from a sensor, a signal indicative of detection of the obstruction within the predetermined proximity of the wireless vehicle charging station;
   determining, via the vehicle controller, whether the detected obstruction is a living object or a lifeless object;
   initiating, via the vehicle controller responsive to a determination that the detected obstruction is a living object, a first remedial action strategy including commanding the motor vehicle to generate a visual or audible cue configured to drive away the living object; and
   initiating, via the vehicle controller responsive to a determination that the detected obstruction is a lifeless object, a second remedial action strategy including directing the motor vehicle to reposition such that the motor vehicle avoids contact with the lifeless object.

2. The method of claim 1, wherein the motor vehicle includes a sound-generating component, and wherein the first remedial action strategy includes commanding the sound-generating component to output the audible cue configured to drive away the living object.

3. The method of claim 1, wherein the motor vehicle includes a light-generating component, and wherein the first remedial action strategy includes commanding the light-generating component to output the visual cue configured to drive away the living object.

4. The method of claim 1, wherein the motor vehicle has autonomous driving capabilities, and wherein the first remedial action strategy includes autonomously rerouting the motor vehicle to evade the living object.

5. The method of claim 1, wherein the motor vehicle has autonomous driving capabilities, and wherein the second remedial action strategy includes autonomously repositioning the motor vehicle to a new location or a new position.

6. The method of claim 1, wherein the motor vehicle includes a light-generating component and a sound-generating component, wherein the lifeless object is a second motor vehicle, and wherein the second remedial action strategy includes commanding the light-generating component to output a visual prompt and/or commanding the sound-generating component to output an audible prompt, both configured to prompt the second motor vehicle to move.

7. The method of claim 1, further comprising:
   receiving, via the vehicle controller, a signal indicating that charging of the electrical storage unit has commenced; and
   continuously monitoring the predetermined proximity of the wireless vehicle charging station for the obstruction during charging of the electrical storage unit.

8. The method of claim 1, further comprising, upon completion of the first or second remedial action strategy, initiating a retry strategy, the retry strategy including a repeated loop of:
   communicating, via the vehicle controller with the sensor, to determine if the obstruction is still within the predetermined proximity of the wireless vehicle charging station;
   responsive to a determination that the obstruction is still within the predetermined proximity, re-executing a corresponding one of the initiating operations; and
   responsive to a determination that the obstruction is not within the predetermined proximity, concluding the retry strategy.

9. The method of claim 8, wherein the retry strategy further includes:
   determining, prior to the re-executing of the corresponding initiating operation, if a predetermined time period has expired or a maximum number of cycles of the repeated loop has been completed; and
   responsive to a determination that the predetermined time period has expired or the maximum number of cycles have been completed, concluding the retry strategy.

10. The method of claim 1, further comprising transmitting, via the vehicle controller to a user, a user prompt with an indication of the detected obstruction and a request for approval to initiate the first or the second remedial action strategy.

11. The method of claim 1, further comprising receiving, via the vehicle controller from a user input device of a user, one or more user parameters modifying the first remedial action strategy or the second remedial action strategy, or both.

12. The method of claim 1, further comprising:
   receiving, via the vehicle controller, an indication that charging of the electrical storage unit has commenced; and
   terminating, via the vehicle controller responsive to receiving the signal indicative of detection of the obstruction, the charging of the electrical storage unit.

13. The method of claim 1, wherein the motor vehicle includes a vehicle body, and wherein the vehicle controller and the sensor are resident to the vehicle body.

14. An electric-drive motor vehicle comprising:
a vehicle body;
a traction battery back attached to the vehicle body;
a wireless charging receiver component electrically coupled to the traction battery back and configured to operably couple with a wireless vehicle charging station; and
a vehicle controller attached to the vehicle body and programmed to:
communicate with the wireless vehicle charging station to initiate charging of the traction battery back;
monitor a predetermined proximity of the wireless vehicle charging station for intrusion of an obstruction;
receive, from a sensor, a signal indicative of detection of the obstruction within the predetermined proximity of the wireless vehicle charging station;
determine whether the detected obstruction is a living object or a lifeless object;
responsive to a determination that the detected obstruction is a living object, initiate a first remedial action strategy including commanding the motor vehicle to generate a visual or audible cue configured to drive away the living object; and
responsive to a determination that the detected obstruction is a lifeless object, initiate a second remedial action strategy including commanding the motor vehicle to reposition such that the motor vehicle avoids contact with the lifeless object.

15. A non-transitory, computer readable medium storing instructions for execution by an onboard vehicle controller of a motor vehicle, the motor vehicle having an electrical storage unit electrically coupled to a wireless charging receiver component configured to operably couple with a wireless vehicle charging station, the instructions causing the vehicle controller to perform steps comprising:
communicating with the wireless vehicle charging station to initiate charging of the electrical storage unit of the motor vehicle;
monitoring a predetermined proximity of the wireless vehicle charging station for intrusion of an obstruction;
receiving, from a sensor, a signal indicative of detection of the obstruction within the predetermined proximity of the wireless vehicle charging station;
determining whether the detected obstruction is a living object or a lifeless object;
initiating, responsive to a determination that the detected obstruction is a living object, a first remedial action strategy including commanding the motor vehicle to generate a visual or audible cue configured to drive away the living object; and
initiating, responsive to a determination that the detected obstruction is a lifeless object, a second remedial action strategy including commanding the motor vehicle to reposition such that the motor vehicle avoids contact with the lifeless object.

16. The non-transitory, computer readable medium of claim 15, wherein the motor vehicle includes a sound-generating component and a light-generating component, and wherein the first remedial action strategy includes commanding the sound-generating component to output the audible cue and/or commanding the light-generating component to output the visual cue, both of which are configured to drive away the living object.

17. The non-transitory, computer readable medium of claim 15, wherein the motor vehicle has autonomous driving capabilities, and wherein the first remedial action strategy includes autonomously rerouting the motor vehicle to evade the living object.

18. The non-transitory, computer readable medium of claim 15, wherein the motor vehicle has autonomous driving capabilities, and wherein the second remedial action strategy includes autonomously repositioning the motor vehicle to a new location or a new position.

19. The non-transitory, computer readable medium of claim 15, wherein the motor vehicle includes a light-generating component and a sound-generating component, wherein the lifeless object is a second motor vehicle, and wherein the second remedial action strategy includes commanding the light-generating component to output a visual prompt and/or commanding the sound-generating component to output an audible prompt, both of which are configured to prompt the second motor vehicle to move.

20. The non-transitory, computer readable medium of claim 15, further comprising instructions causing the vehicle controller to, upon completion of the first or second remedial action strategy, initiate a retry strategy, the retry strategy including a repeated loop of:
communicating with the sensor to determine if the obstruction is still within the predetermined proximity of the wireless vehicle charging station;
responsive to a determination that the obstruction is still within the predetermined proximity, re-executing a corresponding one of the initiating operations; and
responsive to a determination that the obstruction is not within the predetermined proximity, concluding the retry strategy.

* * * * *